(12) United States Patent
Zhang (10) Patent No.: US 12,206,555 B2
(45) Date of Patent: Jan. 21, 2025

(54) METHOD AND APPARATUS FOR DYNAMICALLY ADDING CONSENSUS NODE IN BLOCKCHAIN

(71) Applicant: JINGDONG TECHNOLOGY INFORMATION TECHNOLOGY CO., LTD., Beijing (CN)

(72) Inventor: Shuang Zhang, Beijing (CN)

(73) Assignee: JINGDONG TECHNOLOGY INFORMATION TECHNOLOGY CO., LTD., Beijing (CN)

( * ) Notice: Subject to any disclaimer, the term of this patent is extended or adjusted under 35 U.S.C. 154(b) by 40 days.

(21) Appl. No.: 17/780,907

(22) PCT Filed: May 15, 2020

(86) PCT No.: PCT/CN2020/090656
§ 371 (c)(1),
(2) Date: May 27, 2022

(87) PCT Pub. No.: WO2021/109471
PCT Pub. Date: Jun. 10, 2021

(65) Prior Publication Data
US 2023/0025449 A1 Jan. 26, 2023

(30) Foreign Application Priority Data
Dec. 3, 2019 (CN) .......................... 201911221129.4

(51) Int. Cl.
*H04L 41/12* (2022.01)
*H04L 67/1095* (2022.01)
(52) U.S. Cl.
CPC .......... *H04L 41/12* (2013.01); *H04L 67/1095* (2013.01)

(58) Field of Classification Search
CPC ......... H04L 9/0637; H04L 9/08; H04L 63/10; G06F 16/2379; G06F 21/105; G06Q 20/3678
See application file for complete search history.

(56) References Cited

U.S. PATENT DOCUMENTS 10,049,017 B2 * 8/2018 Karame ................ G06F 11/182
10,803,052 B2 * 10/2020 Yang .................... G06F 11/183
(Continued)

FOREIGN PATENT DOCUMENTS

| CN | 107040594 A | 8/2017 |
| CN | 107171829 A | 9/2017 |

(Continued)

OTHER PUBLICATIONS

First Office Action issued in counterpart Chinese Patent Application No. 201911221129.4, dated Mar. 30, 2021.
(Continued)

*Primary Examiner* — Chirag R Patel
(74) *Attorney, Agent, or Firm* — Westbridge IP LLC (57) ABSTRACT

Disclosed is a method and device for dynamically adding a consensus node in a blockchain. The method comprises: receiving a registration request, initiated by a new participant, for registration as a new consensus node in a consensus network, wherein the registration request is used for initiating a registration to the consensus network; generating, according to the registration request, a network update block in which topological information of a new consensus network is written, wherein the new consensus network comprises consensus nodes in the consensus network and the new consensus node; and synchronizing block information in the consensus network and the network update block to the participant and the consensus nodes so as to obtain the new consensus network.

9 Claims, 7 Drawing Sheets

(56) References Cited

U.S. PATENT DOCUMENTS

| | | | |
|---|---|---|---|
| 10,939,405 B1* | 3/2021 | Haleem | H04L 9/3239 |
| 11,113,272 B2* | 9/2021 | Zhuo | G06F 16/2379 |
| 11,646,879 B2* | 5/2023 | Oh | H04L 9/3239 |
| | | | 713/150 |
| 2018/0337771 A1* | 11/2018 | Baker | H04L 9/3236 |
| 2019/0052453 A1 | 2/2019 | de Ligt | |
| 2019/0068380 A1* | 2/2019 | Tang | A61M 5/172 |
| 2019/0386995 A1* | 12/2019 | Chafe | G06Q 20/065 |
| 2020/0134139 A1* | 4/2020 | Vaish | G06F 16/1805 |
| 2020/0351235 A1* | 11/2020 | Shang | H04L 12/4641 |
| 2020/0403776 A1* | 12/2020 | Oh | H04L 9/3247 |
| 2021/0034606 A1* | 2/2021 | Stamos | G06F 16/184 |

FOREIGN PATENT DOCUMENTS

| | | |
|---|---|---|
| CN | 107579848 A | 1/2018 |
| CN | 108243253 A | 7/2018 |
| CN | 109309723 A | 2/2019 |
| CN | 109474584 A | 3/2019 |
| CN | 109493063 A | 3/2019 |
| CN | 109829724 A | 5/2019 |
| CN | 109831425 A | 5/2019 |
| CN | 109981305 A | 7/2019 |
| CN | 110086856 A | 8/2019 |
| CN | 111131399 A | 5/2020 |
| KR | 20170137388 A | 12/2017 |
| KR | 101994455 B1 | 6/2019 |
| KR | 20190109914 A | 9/2019 |
| TW | 201824818 A | 7/2018 |
| WO | 2018217511 A1 | 11/2018 |
| WO | 2019023475 A1 | 1/2019 |

OTHER PUBLICATIONS

Notification to Grant Patent Right for Invention issued in counterpart Chinese Patent Application No. 201911221129.4, dated Sep. 3, 2021.

Xu et al., Dynamic Practical Byzantine Fault Tolerance, 2018 IEEE Conference on Communications and Network Security (CNS), dated Aug. 13, 2018.

Decision of Refusal issued in counterpart Japanese Patent Application No. JP 2022-529735, dated Feb. 6, 2024.

European Search Report issued in counterpart European Patent Application No. EP 20897236.4, dated Sep. 8, 2023.

International Search Report and Written Opinion issued in corresponding PCT Application No. PCT/CN2020/090656, dated Sep. 7, 2020.

Notice of Reasons for Refusal issued in counterpart Japanese Patent Application No. JP 2022-529735, dated Aug. 16, 2023.

Office Action issued in counterpart Indonesian Patent Application No. P00202207059, dated Jun. 25, 2024.

Office Action issued in counterpart Thai Patent Application No. 2201003240, dated Jun. 24, 2024.

* cited by examiner

METHOD AND APPARATUS FOR DYNAMICALLY ADDING CONSENSUS NODE IN BLOCKCHAIN

CROSS-REFERENCE TO RELATED APPLICATIONS

This application is the National Stage of International Application No. PCT/CN2020/090656, filed on May 15, 2020, which claims priority to Chinese Patent Application No. 201911221129.4, entitled "Method and Device for Dynamically Adding Consensus Node in Blockchain" filed on Dec. 3, 2019, the entire content of which is incorporated herein by

TECHNICAL FIELD

The present disclosure relates to the field of blockchain technology, and in particular relates to a method and an apparatus for dynamically adding a consensus node in a blockchain.

BACKGROUND

Most BFT SMRs (state machine replication system) assume that the consensus network topology is static and will not grow or shrink over time. Even if a few blockchain systems implement the dynamic configuration of consensus nodes in the consensus network topology, due to the use of state machine replication technology, its extremely low performance makes it difficult to be used in engineering practice in the case of large business volume. In addition, although some blockchain systems claim to implement the dynamic configuration of consensus nodes, they are all done on the basis of downtime or business suspension.

With the development of blockchain technology and the trend of blockchain commercial applications, a practical solution for dynamically adding consensus nodes is bound to be needed.

In view of many technical problems existing in related technologies, no effective solutions have yet been provided.

SUMMARY

In order to solve or at least partially solve the above technical problems, the present disclosure provides a method and an apparatus for dynamically adding consensus nodes in a blockchain.

In the first aspect, this disclosure provides a method for dynamically adding a consensus node in the blockchain, comprising:
  receiving a registration request, initiated by a new participant, for registration as a new consensus node in a consensus network, where the registration request is used for initiating a registration to the consensus network;
  generating, according to the registration request, a network update block in which topological information of a new consensus network is written, where the new consensus network comprises consensus nodes in the consensus network and the new consensus node; and
  synchronizing block information in the consensus network and the network update block to the participant and the consensus nodes, so as to form the new consensus network.

In an embodiment of the present disclosure, as described in the foregoing method that generating, according to the registration request, a network update block in which topological information of a new consensus network is written, comprises:
  performing Byzantine fault tolerance consensus on the registration request by the consensus nodes in the consensus network, where the content in the registration request comprises information of the participant, where the information of the participant comprises network address and port number of the participant;
  generating a network update block according to the registration request after a consensus is reached.

In an embodiment of the present disclosure, as described in the foregoing method, before synchronizing block information in the consensus network and the network update block to the participant and the consensus nodes, the method further comprises:
  receiving a request for block information initiated by the participant;
  performing feedback of current block information of each of the consensus nodes to the participant according to the request for block information, so as to enable the participant to select a consensus node with complete block information from the consensus nodes for block information synchronization.

In an embodiment of the present disclosure, as described in the foregoing method, the synchronization of block information in the consensus network and the network update block to the participant comprises:
  receiving a request for block synchronization initiated by the participant to a data source node, where the data source node is a consensus node with complete block information;
  synchronizing existing block information in the data source node to the participant according to the request for block synchronization.

In an embodiment of the present disclosure, as described in the foregoing method, the synchronization of existing block information in the data source node to the participant according to the request for block synchronization comprises:
  determining a set of key-value pair data corresponding to existing block information in the data source node;
  storing the set of key-value pair data in a database of the participant after pulling the set of key-value pair data from a source database corresponding to the data source node.

In an embodiment of the present disclosure, as described in the foregoing method, the synchronization of block information in the consensus network and the network update block to the consensus nodes comprises:
  receiving update configuration information sent by the participant;
  notifying the consensus nodes in the consensus network to perform a block update according to the update configuration information, so that each of the consensus nodes is updated to obtain the network update block.

In an embodiment of the present disclosure, as described in the foregoing method, it further comprises:
  synchronizing, when a new consensus is reached and new block information is generated in the consensus network during a synchronization period, the new consensus node with the new block information, where the synchronization period is a period during which block information in the consensus network and the network update block is synchronized to the participant.

In an embodiment of the present disclosure, as described in the foregoing method, the synchronization of the new block information with the new consensus node comprises:

performing, after the new consensus node determines that a new block is included in other consensus nodes by comparing with the consensus node, replay of a transaction corresponding to the new block through state machine replication, so that the new block is generated in the new consensus node.

In the second aspect, the present disclosure provides an apparatus for dynamically adding a consensus node in a blockchain, where it includes:

a receiving module configured to receive a registration request initiated by a new participant for registration as a new consensus node in the consensus network, where the registration request is used for initiating a registration to the consensus network;

a registration module configured to generate a network update block in which topology information of a new consensus network is written according to the registration request, where the new consensus network comprises consensus nodes in the consensus network and the new consensus node; and a synchronization module configured to synchronize block information in the consensus network and the network update block to the participant and the consensus nodes, so as to form the new consensus network.

In the third aspect, the present disclosure provides an electronic device, comprising: a processor, a communication interface, a memory, and a communication bus, where the processor, the communication interface, and the memory complete communication with each other through the communication bus;

the memory is used to store computer programs;

the processor is configured to implement the methods as described in the foregoing when executing the computer program.

In the fourth aspect, the present disclosure provides a non-transitory computer-readable storage medium, where the non-transitory computer-readable storage medium stores computer instructions, and the computer instructions cause the computer to execute the methods as described in the foregoing.

The embodiments of the present disclosure provide a method and an apparatus for dynamically adding a consensus node in a blockchain, where the method comprises: receiving a registration request initiated by a new participant to register as a new consensus node in the consensus network, where the registration request is used to initiate a registration to the consensus network; generating, according to the registration request, a network update block in which topological information of a new consensus network is written, where the new consensus network comprises consensus nodes in the consensus network and the new consensus node; and synchronizing block information in the consensus network and the network update block to the participant and the consensus nodes, so as to form the new consensus network. Compared with the related technologies, the above-mentioned technical solutions provided by the embodiments of the present disclosure solve the problems of a very large amount of calculation for locally replaying a transaction and low performance caused by state machine replication due to the fact that a node newly added into a consensus network performs data synchronization of a ledger block through state machine replication; moreover, there is no need to replay a transaction, so that the amount of calculation of each consensus node during block information synchronization can be effectively reduced when adding consensus nodes to the consensus network, thereby improving the synchronization efficiency.

BRIEF DESCRIPTION OF THE DRAWINGS

The accompanying drawings herein are incorporated into the specification and constitute a part of the specification, show embodiments that conform to the disclosure, and are used together with the specification to explain the principle of the disclosure.

In order to more clearly describe the technical solutions in the embodiments of the present disclosure, the accompanying drawings that need to be used in the description of the embodiments will be briefly introduced in the following. It is apparent to those persons of ordinary skill in the art that other drawings can be obtained based on these drawings without paying creative work.

DETAILED DESCRIPTION OF THE INVENTION

In order to make the purpose, technical solutions and advantages of the embodiments of the present disclosure clearer, the technical solutions in the embodiments of the present disclosure will be described clearly and completely below in combination with the accompanying drawings in the embodiments of the present disclosure. Obviously, the described embodiments are a part of but not all of the embodiments of the present disclosure. Based on the embodiments in the present disclosure, all other embodiments obtained by those persons of ordinary skill in the art without paying creative work shall fall within the protection scope of this disclosure.

Figure 1:
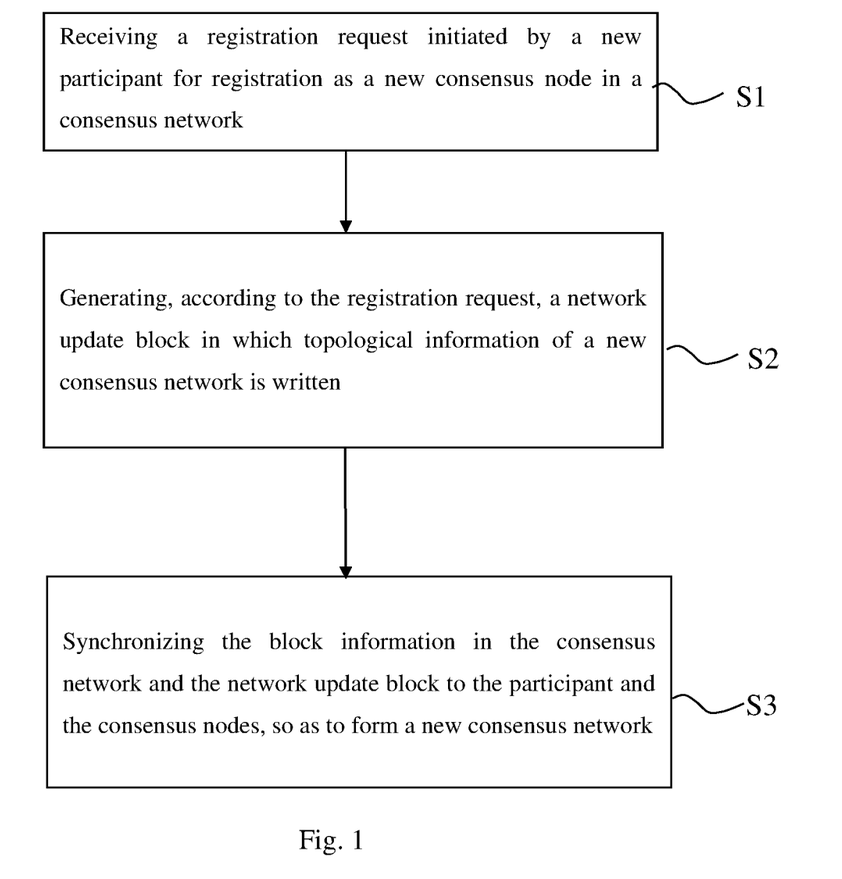
FIG. 1 is a schematic flowchart of a method for dynamically adding a consensus node in a blockchain according to an embodiment of the disclosure.

FIG. 1 is a method for dynamically adding a consensus node in a blockchain according to an embodiment of the disclosure. As shown in FIG. 1, the method includes the following steps S1 to S3.

At Step S1: Receiving a registration request initiated by a new participant for registration as a new consensus node in the consensus network, where the registration request is used to initiate a registration to the consensus network.

In some embodiments of the present disclosure, participants may register as a new consensus node to the consensus network through SDK or a third-party management tool, and then reaching a consensus with the consensus node in the consensus network; in other embodiments of the present disclosure, the operation of initiating the registration request may be initiated in the form of a transaction.

At Step S2: Generating, according to the registration request, a network update block in which topological information of a new consensus network is written, where the new consensus network comprises consensus nodes in the consensus network and the new consensus node.

In an embodiment of the present disclosure, the new consensus network is: a new network composed of simultaneous nodes in the original consensus network and a new consensus node after successful registration of participants; the network update block includes topology information according to the new consensus network, and the topology information is generally the topological structure of the new consensus network.

In an embodiment of the present disclosure, before receiving a registration request initiated in the form of a transaction and the existing block information is Block0, Block1 . . . BlockN, the consensus network will write the transaction into the block after receiving the registration request, that is a new block BlockN+1 is generated, and the topological structure of the new consensus network mentioned above is recorded in this block.

At Step S3: Synchronizing the block information in the consensus network and the network update block to the participant and the consensus node to obtain a new consensus network.

In an embodiment of the present disclosure, the block information is the ledger block in the blockchain; the above-mentioned synchronization of the block information in the consensus network and the network update block to the participant and the consensus nodes comprises: synchronizing the block information in the consensus network and the network update block to the participant, and synchronizing the block information in the consensus network and the network update block to the consensus node; therefore, the block information of the participant and the consensus nodes may reach a consensus, at this point, the participant (the new consensus node after synchronization) and each of the consensus nodes in the original consensus network may be aware of the existence of other nodes from the configuration apart from itself, so that both the new consensus node and the consensus nodes may participate in the consensus of the new transaction, thus a new consensus network is obtained.

Figure 2:
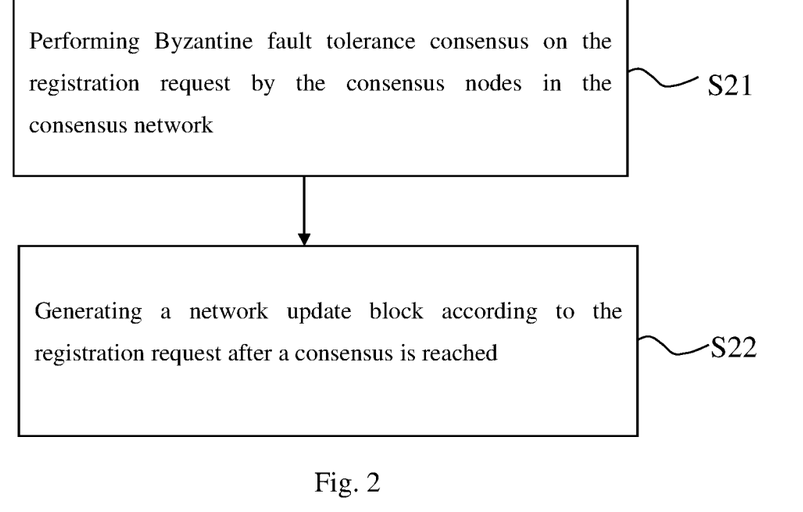
FIG. 2 is a schematic flowchart of a method for dynamically adding a consensus node in a blockchain according to another embodiment of the disclosure.

As shown in FIG. 2, in some embodiments, as described in the aforementioned method, step S2 generates, according to the registration request, a network update block in which topological information of a new consensus network is written, which includes steps S21 and S22 as described below.

At Step S21: The consensus node in the consensus network performs Byzantine fault tolerance consensus on the registration request; the content of the registration request includes the information of the participant, where the information of the participant includes the network address and port number of the participant.

In an embodiment of the present disclosure, the aforementioned Byzantine fault tolerance consensus includes three stages as follows:

1) a leader proposal stage: a proposal that takes participants as new consensus nodes;

2) a writing stage: writing the proposal into each consensus node;

3) an accepting stage: each consensus node accepts the participant as a new consensus node.

At Step S22: Generating a network update block according to the registration request after a consensus is reached.

In an embodiment of the present disclosure, reaching a consensus means that each block accepts the proposal of taking the participant as a new consensus node; generally, the topology information of the consensus network may exist in the genesis block, and the topology information may include the information of network address and port number of each consensus, since the registration request may include the network address and port number of the participant, the network update block including the topology information of the new consensus network may be obtained as long as the topology information in the genesis block and the registration request are used. At this point, the topological structure of the new consensus network has been placed in the database of the original consensus nodes.

Figure 3:
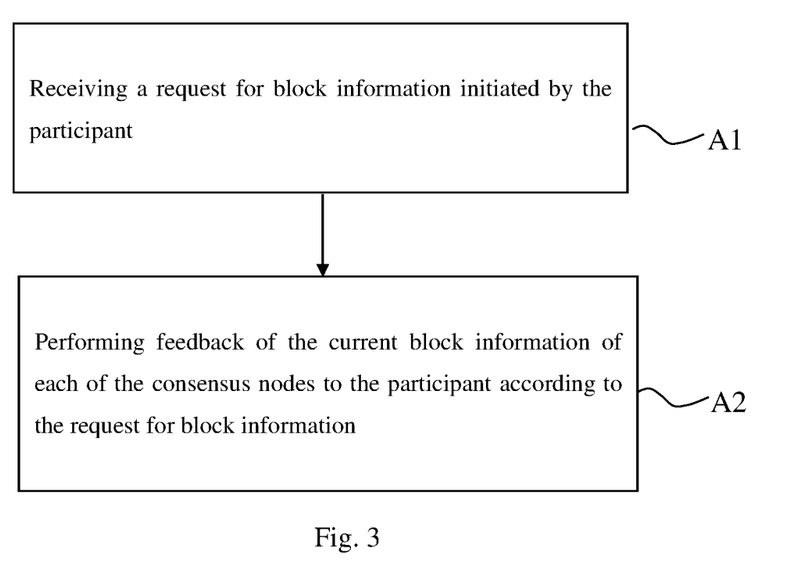
FIG. 3 is a schematic flowchart of a method for dynamically adding a consensus node in a blockchain according to another embodiment of the disclosure.

As shown in FIG. 3, in some embodiments, as described in the aforementioned method of S3, before synchronizing block information in the consensus network and the network update block to the participant and the consensus nodes, it further includes the following steps A1 and A2.

At Step A1: Receiving a request for block information initiated by the participant.

In some embodiments of the present disclosure, there is no ledger block information in the database corresponding to the participant at the beginning of the startup, therefore, if the participant needs to join the consensus with other consensus nodes, it needs to acquire the block information of other consensus nodes; in other embodiments of the present disclosure, the method for acquiring block information of other consensus nodes may be acquired by the participant's initiative request.

At Step A2: Performing feedback of current block information of each of the consensus nodes to the participant according to the request for block information, which is used to enable the participant to select a consensus node with complete block information from the consensus nodes to synchronize the block information.

In an embodiment of the present disclosure, since there may be "bad nodes" in the consensus network, the participant needs to exchange information with the consensus nodes in the consensus network to select the consensus node with complete ledger data as the data source node; therefore, upon receiving the request for block information, the current block information of each consensus node is fed back to the participant, so that the participant can select a consensus node with complete block information from each consensus node to synchronize the block information.

Figure 4:
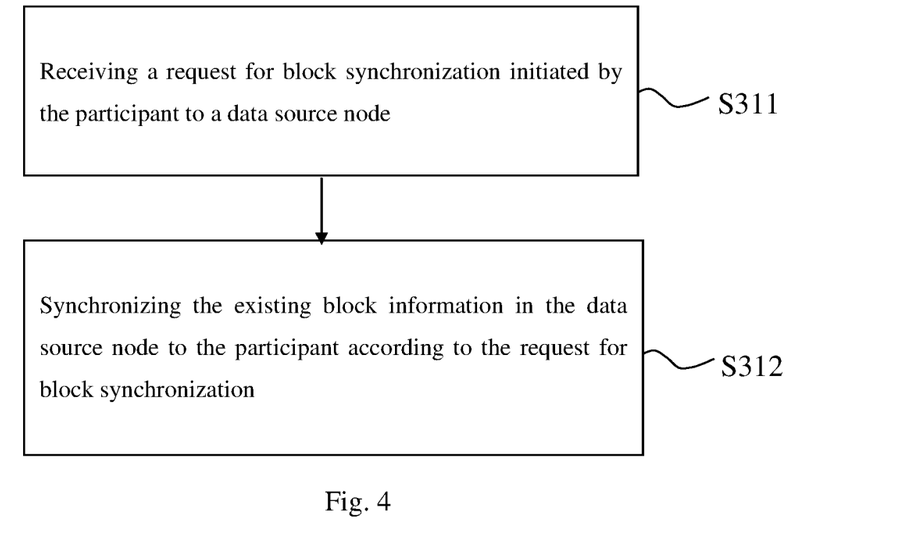
FIG. 4 is a schematic flowchart of a method for dynamically adding a consensus node in a blockchain according to another embodiment of the disclosure.

As shown in FIG. 4, in some embodiments, as in the above-mentioned method, step S3 synchronizes the block information in the consensus network and the network update block to the participant, including steps S311 and S312 as follows.

At Step S311: Receiving a request for block synchronization initiated by the participant to the data source node, where the data source node is a consensus node with complete block information.

In an embodiment of the present disclosure, the data source node is a consensus node with complete block information selected by the participant in steps A1 and A2 above; in an embodiment of the present disclosure, the participant will learn the latest block information existing in the data source node, so the above-mentioned block synchronization request will include the blocks that need to be synchronized. In an embodiment, when the participant knows that the data source node has the latest block BlockN+1 according to the interactive information, it will request to synchronize all blocks from Block0 to BlockN+1; generally, consensus nodes with complete block information will include the network update block in the foregoing embodiment.

At Step S312: Synchronizing the existing block information in the data source node to the participant according to the request for block synchronization.

In an embodiment of the present disclosure, the synchronization method for existing block information in this embodiment may be data synchronization. Therefore, it is obviously different from the method of data synchronization of the ledger block through state machine replication in the related technology, which can greatly reduce the large amount of calculation and performance impact of local replay transactions caused by state machine replication.

Figure 5:
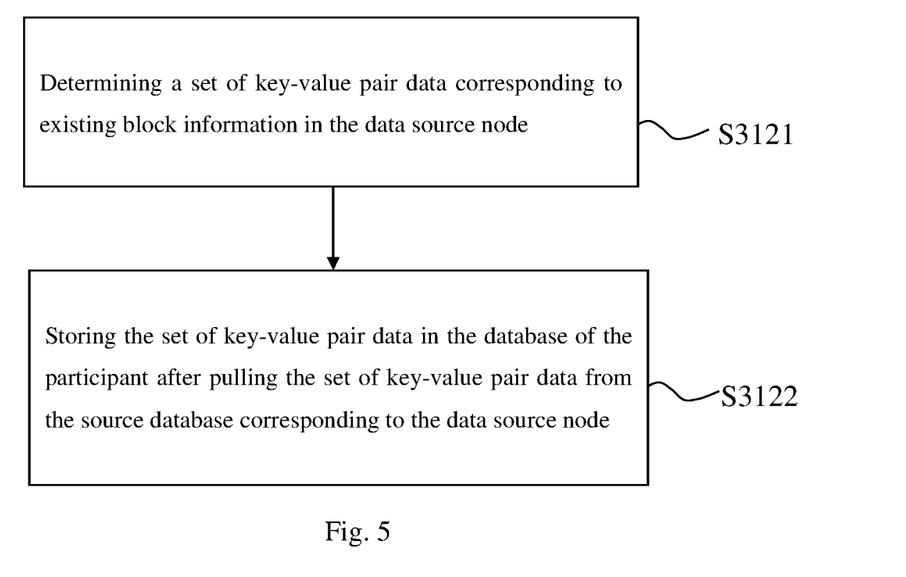
FIG. 5 is a schematic flowchart of a method for dynamically adding a consensus node in a blockchain according to another embodiment of the disclosure.

As shown in FIG. 5, in some embodiments, as described in the aforementioned method, step S312 synchronizes the existing block information in the data source node to the participant according to the request for block synchronization, includes steps S3121 and S3122 as follows.

At Step S3121: Determining a set of key-value pair data corresponding to existing block information in the data source node.

In an embodiment of the present disclosure, the above-mentioned set of key-value pair data is a set of KV data including multiple KV data. Each block information corresponds to one KV data, and the KV data means key-value data, which adopts a distributed storage system characterized by fast query speed, large amount of stored data and supporting high concurrency, and it is very suitable for querying through the primary key; that is, the block information is stored in the database in the form of key-value pair data.

At Step S3122: Storing the set of key-value pair data in the database of the participant after it's pulled from the source database corresponding to the data source node.

In an embodiment of the present disclosure, after the set of key-value pair data is pulled out from the source database of the aforementioned data source node, and stored in the participant's database, the participant will meet the requirements of consistency with the ledger block of the data source node if the data source node does not conduct business transactions.

Figure 6:
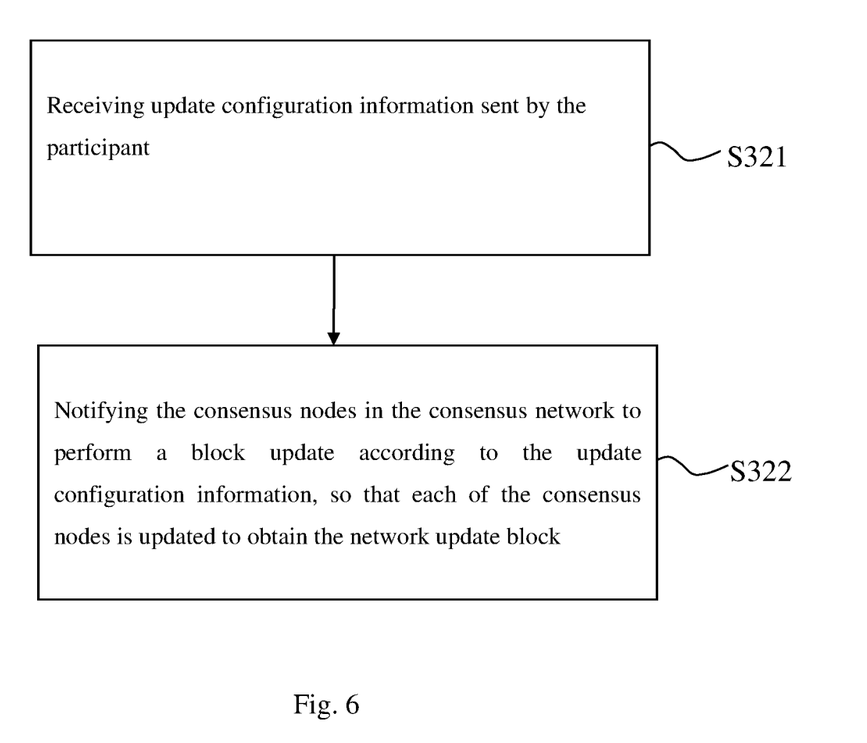
FIG. 6 is a schematic flowchart of a method for dynamically adding a consensus node in a blockchain according to another embodiment of the disclosure.

As shown in FIG. 6, in some embodiments, as described in the aforementioned method, step S3 synchronizes the block information in the consensus network and the network update block to the consensus nodes, including steps S321 and S322 as follows.

At Step S321: Receiving the update configuration information sent by the participant.

Generally, this step follows the implementation of step S312. Since the participant wants to participate in the subsequent consensus, it sends the update configuration information to the original consensus network to notify each consensus node to update the configuration at the consensus level, that is, the topology information of the new consensus network.

At Step S322: Notifying the consensus nodes in the consensus network to update the block according to the update configuration information, so that each of the consensus nodes is updated to acquire the network update block.

In an embodiment of the present disclosure, the network update block can enable each of the consensus nodes to acquire the block through transactions. At this point, the participant and the consensus node in the original consensus network may be aware of the existence of other nodes (including participant) apart from themselves from the configuration and jointly participate in the consensus of the new transaction, therefore, the participant will be in the same new consensus network with other consensus nodes and successfully register as a new consensus node.

Figure 7:
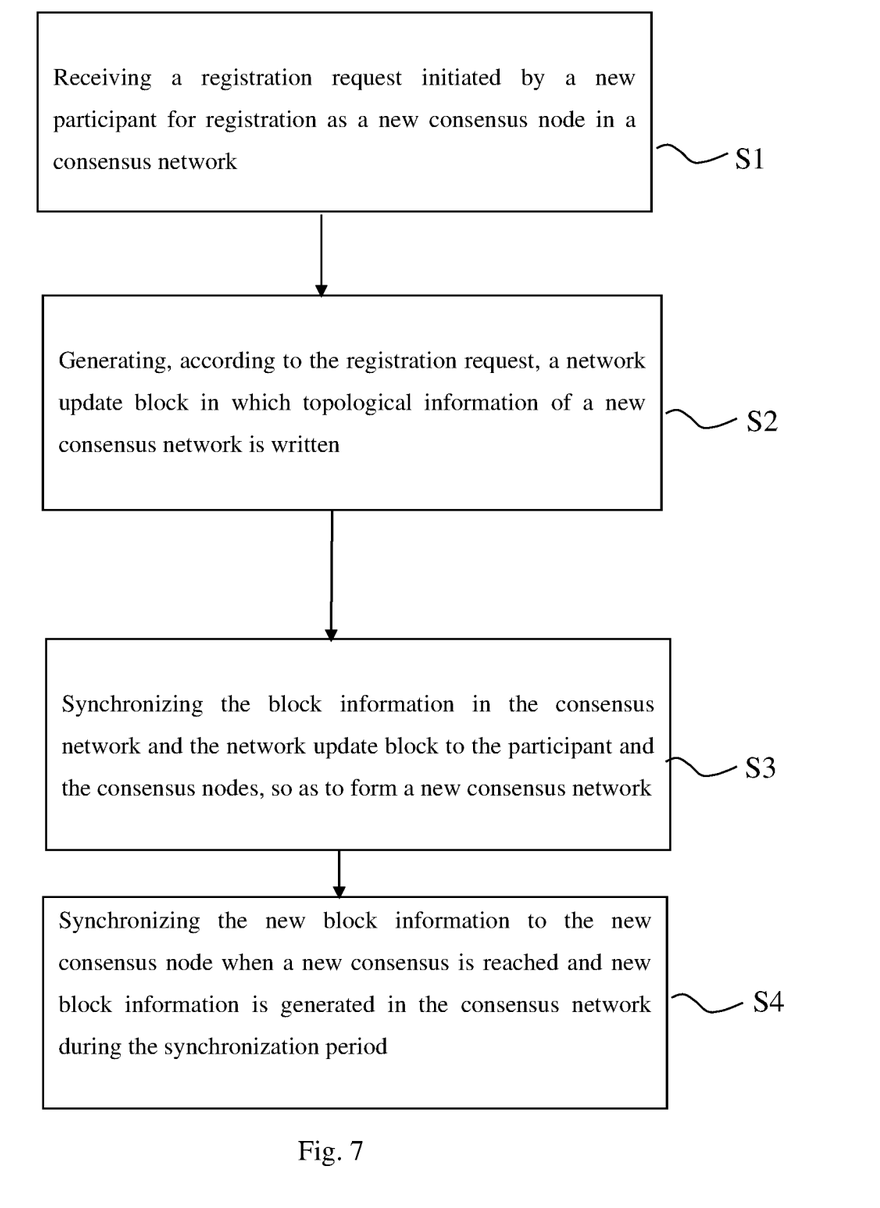
FIG. 7 is a schematic flowchart of a method for dynamically adding a consensus node in a blockchain according to another embodiment of the disclosure.

As shown in FIG. 7, in some embodiments, the aforementioned method further comprises the following step S4.

At Step S4: Synchronizing the new consensus node with the new block information when a new consensus is reached and a new block information is generated in the consensus network during the synchronization period, which is a period in which the block information in the consensus network and the network update block are synchronized to the participant.

In an embodiment of the present disclosure: in the process of pulling the set of key-value pair data by the participant, an original consensus network node does not interrupt business transactions, and reaches two rounds of consensus on the new transaction, resulting in two new blocks, BlockN+2 and BlockN+3; after the new consensus node (a consensus node after successful registration of the participant) starts the consensus, there will be a process of comparing the block information with other consensus nodes, and the new consensus node knows that it lags behind two blocks through the comparison. At this point, the new block information is synchronized to achieve the consistency with the block information of other consensus nodes.

In some embodiments as described in the aforementioned method, new block information synchronization is performed for the new consensus node in step S4, specifically including:

performing, after the new consensus node determines that the new block is included in other consensus nodes by comparing with the consensus node, replay of the transaction corresponding to the new block through state machine replication, so that a new block is generated in the new consensus node.

In other words, after the new consensus node starts the consensus, and knows that it is N blocks behind (i.e., the above new block information) by comparing the block information with other consensus nodes, it may replay the transactions in the backward block through state machine replication, so as to achieve the consistency with the block information of other consensus nodes.

Therefore, the present disclosure solves the problem of dynamically adding a consensus node under the condition without downtime and business interruption through a design solution combining block information database replication and state machine replication (transaction replay) compensation technology.

Figure 8:
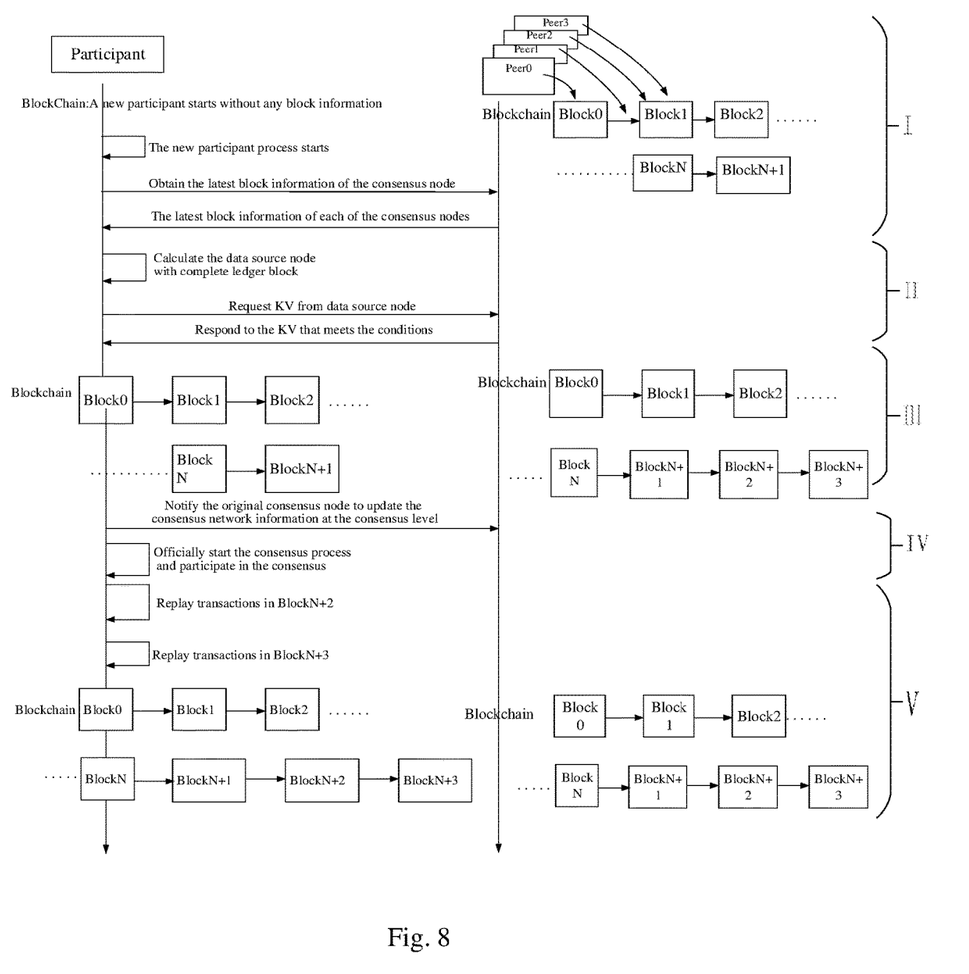
FIG. 8 is a flowchart of a processing method according to an applied embodiment of this disclosure.

As shown in FIG. 8, the method according to this embodiment of the present disclosure is implemented as follows, which includes five parts I to V.

I. Register a New Consensus Participant

Registering a new participant to the consensus network through SDK or a third-party management tool. This operation will be initiated in the form of a transaction. The transaction content includes the information of network address and port of the new participant; when the transaction reaches the original consensus network, it will go through a three-stage BFT consensus (Byzantine fault tolerance consensus). After the consensus is reached, the transaction is written into the block, that is, a new block of BlockN+1 is generated, in which the topology of the new consensus network is recorded. The purpose of this step is to record the new network topology of the consensus node from the database storage level, even if the consensus node shuts down and restarts, the latest consensus network topology information may be loaded from the block information.

II. Replicate the Set of KV Data from the Data Source Node

The new consensus network topology has been placed in the database of consensus nodes in the original consensus network, and now the new participant node process is started. At the beginning of the startup, there is no ledger block information in the database corresponding to the new node; at this point, it needs to exchange information with the consensus node in the original consensus network to select a consensus node with complete ledger data as the data source node. The new participant learns that the data source node has the latest block BlockN+1 according to the interactive information, and then pulls the set of KV data in the database corresponding to the blocks from 0 to N+1.

III. Consensus Nodes in the Original Network Process New Transactions

In the process of pulling the set of KV data by the new participant, the original consensus network node does not interrupt the business transactions, and reaches two rounds of consensus on the new transaction, thus generating two new blocks of BlockN+2 and BlockN+3.

IV. The New Participant Starts Consensus

After the new participant pulls all block data from 0 to N+1, including the block data of consensus network topology change and if the new participant wants to participate in the subsequent consensus, it needs to send a message to the original consensus network to notify the consensus node in the original consensus network to update the configuration at the consensus level, that is, the new topology information of the consensus node. And then, the new participant and the consensus nodes in the original consensus network may be aware of the existence of other nodes from the configuration and jointly participate in the consensus of new transactions.

V. State Machine Replication (Replay Part of the Transaction)

After the new participant starts the consensus, there will be a process of comparing the ledger information with other consensus nodes. and through the comparison, it knows that it lags behind two blocks. At this point, the transactions in the backward blocks will be replayed through the state machine replication so as to achieve consistency with other consensus node ledger blocks.

Figure 9:
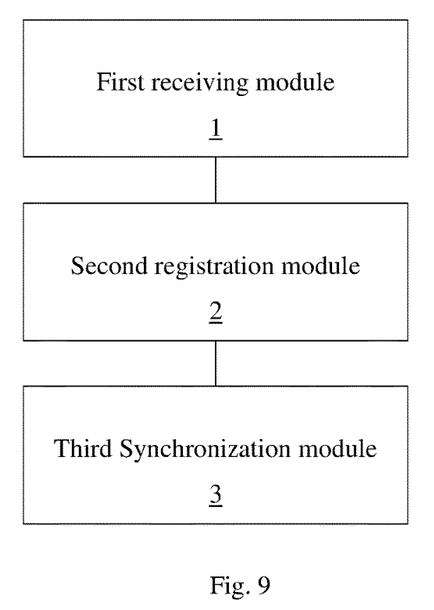
FIG. 9 is a block diagram of an apparatus for dynamically adding a consensus node in a blockchain according to an embodiment of the disclosure.

As shown in FIG. 9, an embodiment according to another aspect of the present disclosure further provides an apparatus for dynamically adding a consensus node in a blockchain, which includes the following modules.

A receiving module 1 is configured to receive a registration request initiated by a new participant for registration as a new consensus node in the consensus network, where the registration request is used to initiate a registration to the consensus network.

A registration module 2 is configured to generate a network update block in which topological information of a new consensus network is written according to the registration request, where the new consensus network includes the consensus nodes in the consensus network and the new consensus node.

A synchronization module 3 is configured to synchronize block information and network update blocks in the consensus network to the participant and the consensus nodes to obtain a new consensus network.

Specifically, the specific process of each module implementing its function in the electronic device of the embodiment of the present disclosure can be referred to the relevant description in the method embodiment, which will not be repeated here.

Figure 10:
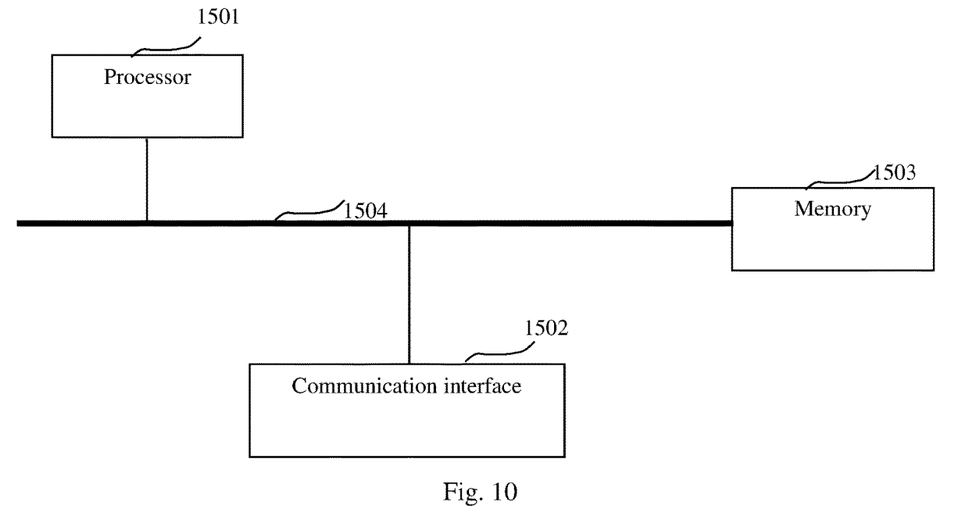
FIG. 10 is a schematic structural diagram of an electronic device according to an embodiment of the disclosure.

According to another embodiment of the present disclosure, an electronic device is also provided: as shown in FIG. 10, the electronic device may include: a processor 1501, a communication interface 1502, a memory 1503, and a communication bus 1504, where the processor 1501, the communication interface 1502 and the memory 1503 communicate with each other through the communication bus 1504.

The memory 1503 is configured to store computer programs.

The processor 1501 is configured to implement the steps of the foregoing method embodiment when executing the program stored in the memory 1503.

The bus mentioned in the above electronic device may be a peripheral component interconnect (PCI) bus or an extended industry standard architecture (EISA) bus, etc. The bus may be divided into address bus, data bus, control bus and so on. For ease of representation, only one thick line is used in the figure, but it does not mean that there is only one bus or one type of bus.

The communication interface is used for communication between the above-mentioned electronic device and other devices.

The memory may include random access memory (RAM), and may also include non-volatile memory (NVM), such as at least one disk storage. Optionally, the memory may also be at least one storage device located far away from the foregoing processor.

The above-mentioned processor may be a general-purpose processor, including a central processing unit (CPU), a network processor (NP), etc.; it may also be a digital signal processor (DSP), an application specific integrated circuit (ASIC), field-programmable gate array (FPGA) or other programmable logic devices, discrete gates or transistor logic devices, discrete hardware components.

The embodiments of the present disclosure also provide a non-transitory computer-readable storage medium, the non-transitory computer-readable storage medium stores computer instructions, and the computer instructions cause the computer to execute the steps of the foregoing method embodiment.

It should be noted that in this article, relational terms such as "first" and "second" herein are only used to distinguish one entity or operation from another entity or operation, and do not necessarily require or imply that there is any such actual relationship or sequence between entities or operations. Moreover, the terms "include", "comprise" or any other variants thereof are intended to cover non-exclusive inclusion, so that a process, method, item or device including a series of elements not only includes those elements, but also other elements not explicitly listed, or also include elements inherent to this process, method, item or device. Without further restrictions, the element defined by the sentence "including a . . . " does not exclude the existence of other identical elements in the process, method, item, or device that includes the element.

The above are only specific embodiments of the present disclosure, so that those skilled in the art can understand or implement the present disclosure. Various modifications to these embodiments will be apparent to those skilled in the art, and the general principles defined herein can be implemented in other embodiments without departing from the spirit or scope of the present disclosure. Therefore, the present disclosure will not be limited to these embodiments shown herein, but will conform to the widest range consistent with the principles and novel features applied herein.

The invention claimed is:

1. A method for dynamically adding a consensus node in a blockchain, comprising:

receiving a registration request initiated by a new participant for registration as a new consensus node in a consensus network, wherein the registration request is used for initiating a registration to the consensus network;

generating, according to the registration request, a network update block in which topological information of a new consensus network is written, wherein the new consensus network comprises consensus nodes in the consensus network and the new consensus node; and synchronizing block information in the consensus network and the network update block to the participant and the consensus nodes, so as to form the new consensus network;

wherein, synchronizing block information in the consensus network and the network update block to the participant comprises:

receiving a request for block synchronization initiated by the participant to a data source node, wherein the data source node is a consensus node with complete block information; and synchronizing existing block information in the data source node to the participant according to the request for block synchronization.

2. The method according to claim 1, wherein, generating, according to the registration request, a network update block in which topological information of a new consensus network is written comprises:

performing Byzantine fault tolerance consensus on the registration request by the consensus nodes in the consensus network, wherein content in the registration request comprises information of the participant, wherein the information of the participant comprises network address and port number of the participant; and generating a network update block according to the registration request after a consensus is reached.

3. The method according to claim 1, before synchronizing block information in the consensus network and the network update block to the participant and the consensus nodes, further comprising:

receiving a request for block information initiated by the participant; and performing feedback of current block information of each of the consensus nodes to the participant according to the request for block information, so as to enable the participant to select a consensus node with complete block information from the consensus nodes for block information synchronization.

4. The method according to claim 1, wherein, synchronizing existing block information in the data source node to the participant according to the request for block synchronization comprises:

determining a set of key-value pair data corresponding to existing block information in the data source node; and storing the set of key-value pair data in a database of the participant after pulling the set of key-value pair data from a source database corresponding to the data source node.

5. The method according to claim 1, wherein, synchronizing block information in the consensus network and the network update block to the consensus nodes comprises:

receiving update configuration information sent by the participant; and notifying the consensus nodes in the consensus network to perform a block update according to the update configuration information, so that each of the consensus nodes is updated to obtain the network update block.

6. The method according to claim 1, further comprising:

synchronizing, when a new consensus is reached and new block information is generated in the consensus network during a synchronization period, the new consensus node with the new block information, wherein the synchronization period is a period during which block information in the consensus network and the network update block is synchronized to the participant.

7. An apparatus for dynamically adding a consensus node in a blockchain, comprising:

a receiving module, configured to receive a registration request initiated by a new participant for registration as a new consensus node in the consensus network, wherein the registration request is used for initiating a registration to the consensus network;

a registration module, configured to generate a network update block in which topology information of a new consensus network is written according to the registration request, wherein the new consensus network comprises consensus nodes in the consensus network and the new consensus node; and a synchronization module, configured to synchronize block information in the consensus network and the network update block to the participant and the consensus nodes, so as to form the new consensus network;

wherein, the step of synchronizing block information in the consensus network and the network update block to the participant comprises:

receiving a request for block synchronization initiated by the participant to a data source node, wherein the data source node is a consensus node with complete block information; and synchronizing existing block information in the data source node to the participant according to the request for block synchronization.

8. An electronic device, comprising: a processor, a communication interface, a memory, and a communication bus, wherein the processor, the communication interface, and the memory complete communication with each other through the communication bus;

the memory is used to store computer programs;

the processor is configured to implement the method according to claim 1 when executing the computer programs.

9. A non-transitory computer-readable storage medium, wherein the non-transitory computer-readable storage medium stores computer instructions, which, when executed by a processor, cause the processor to perform the method according to claim 1.

\* \* \* \* \*